United States Patent Office 3,150,119
Patented Sept. 22, 1964

3,150,119
VINYL AROMATIC XANTHATE POLYMERS AND PROCESS FOR THEIR PREPARATION
David S. Hoffenberg and Robert Ben Booth, Stamford, Conn., assignors to American Cyanamid Company, New York, N.Y., a corporation of Maine
No Drawing. Filed Dec. 20, 1961, Ser. No. 160,936
7 Claims. (Cl. 260—79.7)

This invention relates to the provision of new polymeric materials by two methods, one of which involves the preparation of new monomeric intermediates, both the polymers and monomeric intermediates of this invention being useful in ore flotation, in plant (e.g., weed) defoliation and in the control of mildew and fungus growth.

More particularly this invention relates to the provision of homo- and copolymers of S-vinylarylmethylxanthic acid esters by one method from the reaction of (a) a chloromethylarylvinyl homopolymer or (b) a copolymer thereof with a polymerizable vinyl compound, and known alkali metal xanthates; and in accordance with the other method, by the homo- or copolymerization of the new monomeric product of a chloromethylarylvinyl compound and an alkali metal xanthate.

In the practice of one process of this invention a vinylarylmethylchloride represented by the following general formula:

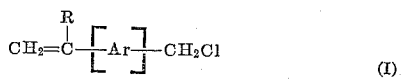

wherein R is hydrogen or methyl; and Ar is a carbocyclic, aromatic nucleus of less than three 6-membered rings (e.g., phenylene, naphthylene, biphenylene) and the mono-lower alkyl, di-lower alkyl, lower alkoxy, aryloxy, halo (especially chloro, bromo and iodo), cyano, carboxy and carbo-lower alkoxy derivatives thereof is subjected to either homopolymerization conditions to yield a homopolymer of a compound of Formula I; or copolymerization conditions with a polymerizable vinyl or vinylidene monomer, to yield a copolymer of the compound of Formula I.

The resulting intermediary homopolymer or copolymer, as the case may be, is subsequently reacted with an alkali metal xanthate represented by the following general formula:

wherein X is an alkali metal (e.g., sodium or potassium) and R' is alkyl (e.g., methyl, ethyl, propyl, amyl, octyl, dodecyl and tridecyl) or aralkyl especially monocyclic carbocyclic aromatic-lower alkyl (e.g., benzyl and phenethyl) to yield the final homo- or copolymers of this invention which may be further purified, as desired.

The polymerization reaction to give the intermediary homopolymer and the copolymer may be conducted along conventional lines employing a catalyst or initiator (e.g., azo-bisbutyronitrile or redox systems such as potassium meta bisulfitepotassium persulfate or an organic peroxide such as benzoyl peroxide or di-tertbutylperoxide) with or without additional heat and in the presence or absence of a solvent as desired. Under optimum conditions the yield of polymerized product is over 90%.

Suitable vinyl aromatic methyl chlorides are styrenes such as o-, m- and p-chloromethyl styrene and o-, m-, p-chloromethyl-α-methyl styrene or chloromethyl vinyl naphthalene such as 1-chloromethyl-2-vinyl naphthalene, 2-chloromethyl-1-vinyl naphthalene and 1-chloromethyl-5-vinyl naphthalene. These vinyl aromatic naphthyl methyl chlorides may be homopolymerized as above stated, or copolymerized with a polymerizable vinyl monomer. Among the polymerizable comonomers which may be used are styrenes (e.g., styrene, divinylbenzene, 2,5-dichlorostyrene, p-dimethyl amino styrene, o-, m- and p-chlorostyrene, o-, m- and p-cyanostyrene, o-, m- and p-methoxystyrene, o-, m- and p-nitrostyrene, 2,4-dimethylstyrene, 2,5-dimethylstyrene, p-ethylstyrene, o-bromostyrene and o-, m- and p-methylstyrene; acrylics such as methacrylic acid, acrylic acid, methyl methacrylate, methyl α-chloracrylate, the diethyl glycol ester of acrylic acid, the pentaerythritol ester of acrylic acid, acrylonitrile, methacrylonitrile, acrylamide, methacrylamide, methylene bis-acrylamide and the like, butadiene chloroprene, isoprene and the like; allyl compounds such as allyl esters, e.g., allyl acetate, allyl chloride, allyl propionate, allyl acrylate and the like; vinyl compounds such as vinylidenechloride vinylacetate, 2-vinylcarbazole, 2-vinylpyridine, methylvinyl ketone, methylvinyl sulfide, 2-vinyl thiophene, vinylethyl ether and the like; and unsaturated polycarboxylic acids and the esters and anhydrides thereof such as maleic anhydride, diethylfumarate itaconic acid and itaconic anhydride.

Suitable xanthates inter alia, are the alkali metal salts especially the sodium and potassium salts of the following O-substituted xanthic acids: O-lower alkyl-xanthatic acids, e.g., methyl xanthate and ethyl xanthate; and O-monocyclic aryl-lower alkyl xanthates, e.g., O-benzylxanthate and O-phenethyl xanthate.

The condensation reaction between the alkali metal xanthate and the above mentioned copolymers and homopolymers of this invention proceeds to give the desired products in good yields. It may be conducted without a solvent or in the presence of an inert organic solvent in which both reactants are soluble such as the conventionally known polar organic solvents, e.g., the lower alkanols such as methanol and ethanol; the lower alkanones such as ethylmethylketone, dimethylformamide and dimethylsulfoxide. Since the reaction will proceed within a wide temperature range, temperatures are not critical and ambient temperatures may be conveniently used. It may however be necessary to apply heat in order to dissolve the reactants in the solvent, if one is used. Likewise, the proportions of reactants are not critical. A 1:1 ratio may be employed, although an excess of either reactants will not interfere with the reaction. If it is desired, either of the reactants may be present in excess (as in the range of proportions between 1:2 and 2:1) without detrimentally affecting the efficiency. After the reaction has proceeded for about one to five hours, the product may be isolated and purified in accordance with known procedures.

In an alternative procedure, the final homo- and copolymers of this invention may be prepared by reacting a monomeric vinyl arylmethylchloride of Formula I with an xanthate of Formula II to yield the new monomers of this invention represented by the following general formula:

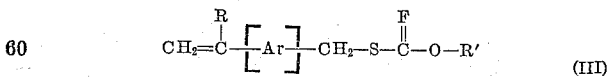

wherein R, Ar and R' are as hereinbefore defined. Temperatures for the condensation reaction are not critical, and may suitably be maintained at about 20° to 40° C., i.e., at ambient temperature. The reactants are preferably present in stoichiometric amounts or, if desired, an excess of either (i.e., a 1:2 to 2:1 ratio) may be employed. It is preferable to employ a diluent in which both reactants are soluble, e.g., an inert polar organic solvent such as a lower alkanol, a di-lower alkyl ketone; or dimethylformamide or dimethylsulfoxide. After about one to five hours under reaction conditions, the product may be isolated (as by filtration) and purified (as by evaporating the solvent off and then distillation under very low pressures).

The reaction of the monomers of this invention, to yield the final polymers of this invention, may be either of the homopolymerization or the copolymerization type, conducted under essentially the same conditions and with the copolymerizable vinyl monomers used in the first method of this invention hereinbefore described.

The compounds of this invention, i.e., the monomers of Formula III or the final homo- or copolymers thereof are viscous, oily liquids or white solids which are useful as promoters in the beneficiation of base metal ores by froth flotation for the recovery of the base metals, plant defoliation and in control of mildew and fungus growth. Thus, they can be used as flotation promoters for example, froth flotation in the recovery of copper, lead and zinc from oxide and sulfide ores containing these metals. For this purpose they are conveniently employed in the flotation system in a concentration of from 0.02 to 0.3 pound per ton of ore treated.

The following examples, in which parts are by weight unless otherwise expressed, are presented to more fully illustrate the present invention.

EXAMPLE 1

*S-o-Vinylbenzyl-O-n-Amylxanthate*

To 500 parts of methylethyl ketone is added 53 parts of potassium amyl xanthate which is brought into solution by warming on a steam bath. 40 parts of o-chloromethylstyrene are then added rapidly and within a few minutes potassium chloride begins to precipitate. After allowing the reaction to proceed for an additional five hours at about 25° C., the potassium chloride is removed by filtration and the solvent evaporated under reduced pressure to yield about 69 parts of the desired product.

EXAMPLE 2

*S-p-Vinylbenzyl-O-n-Amylxanthate*

To 500 parts of ethanol is added 49 parts of sodium amyl xanthate which is brought into solution by warming on a steam bath, 40 parts of p-chloromethylstyrene are then added rapidly and within a few minutes sodium chloride begins to precipitate. After allowing the reaction to proceed for an additional five hours at about 25° C., the sodium chloride is removed by filtration and the solvent evaporated under reduced pressure to yield about 67 parts of the desired product.

EXAMPLE 3

*S-[1(4-Vinyl) Naphthylmethyl]-O-Benzylxanthate*

To 500 parts of acetone is added 67 parts of potassium benzyl xanthate which is brought into solution by warming on a steam bath. 61 parts of 1-vinyl-4-chloromethyl naphthalene are then added rapidly and within a few minutes potassium chloride begins to precipitate. After allowing the reaction to proceed for an additional five hours at about 25° C., the potassium chloride is removed by filtration and the solvent evaporated under reduced pressure to yield about 97 parts of the desired product.

EXAMPLE 4

*S-m-Vinylbenzyl-O-Ethyl-Xanthate*

To 500 parts of methylethylketone is added 161 parts of potassium ethyl xanthate which is brought into solution by warming on a steam bath. 152 parts of m-vinylbenzylchloride are then added rapidly and within a few minutes potassium chloride begins to precipitate. After allowing the reaction to proceed for an additional five hours at about 25° C., the potassium chloride is removed by filtration and the solvent evaporated under reduced pressure to yield about 225 parts of the desired product.

EXAMPLE 5

*S-[(2-Vinyl)-1-Biphenylylmethyl]-O-Ethylxanthate*

To 500 parts of methylethylketone is added 40 parts of potassium ethyl xanthate which is brought into solution by warming on a steam bath. 57 parts of 1[(2-vinyl)-biphenylyl]methylchloride are then added rapidly and within a few minutes potassium chloride begins to precipitate. After allowing the reaction to proceed for an additional five hours at about 25° C., the potassium chloride is removed by filtration and the solvent evaporated under reduced pressure to yield about 65 parts of the desired product.

EXAMPLE 6

*S-[(2-Vinyl)-1-Biphenylylmethyl]-O-Dodecylxanthate*

To 1000 parts of methylethylketone is added 71 parts of potassium dodecyl xanthate which is brought into solution by warming on a steam bath. 57 parts of 2-vinyl-1-biphenylylmethylchloride are then added rapidly and within a few minutes potassium chloride begins to precipitate. After allowing the reaction to proceed for an additional five hours at about 25° C. the potassium chloride is removed by filtration and the solvent evaporated under reduced pressure to yield about 100 parts of the desired product.

EXAMPLE 7

*S-(2-Vinyl-4-Methoxybenzyl)-O-Amylxanthate*

To 400 parts of methylethylketone is added 21 parts of potassium amyl xanthate which is brought into solution by warming on a steam bath. Eighteen parts of 2-vinyl-4-methoxybenzylchloride are then added rapidly and within a few minutes potassium chloride begins to precipitate. After allowing the reaction to proceed for an additional five hours at about 25° C., the potassium chloride is removed by filtration and the solvent evaporated under reduced pressure to yield about 31 parts of the desired product.

EXAMPLE 8

*S-(2-Vinyl-4-Phenoxybenzyl)-O-Isopropylxanthate*

To 500 parts of methylethylketone is added 18 parts of sodium isopropylxanthate which is brought into solution by warming on a steam bath. Twenty four parts of 2-vinyl-4-phenoxybenzylchloride are then added rapidly and within a few minutes sodium chloride begins to precipitate. After allowing the reaction to proceed for an additional five hours at about 25° C. the sodium chloride is removed by filtration and the solvent evaporated under reduced pressure to yield about 36 parts of the desired product.

EXAMPLE 9

*S-(4-Vinyl-3-Chlorobenzyl)-o-n-Amylxanthate*

To 500 parts of methylethylketone is added 18.4 parts of sodium n-amyl xanthate which is brought into solution by warming on a steam bath. 19 parts of 4-vinyl-3-chlorobenzylchloride are then added rapidly and within a few minutes sodium chloride begins to precipitate. After allowing the reaction to proceed for an additional five hours at about 25° C., the sodium chloride is removed by filtration and the solvent evaporated under reduced pressure to yield about 31 parts of the desired product.

EXAMPLE 10

*S-o-Vinylbenzyl-O-Sec. Butyl-Xanthate*

To 500 parts of methylethylketone is added 19 parts of potassium sec.-butylxanthate which is brought into solution by warming on a steam bath. 31 parts of o-vinylbenzylchloride are then added rapidly and within a few minutes potassium chloride begins to precipitate. After allowing the reaction to proceed for an additional five hours at about 25° C., the potassium chloride is removed by filtration and the solvent evaporated under reduced pressure to yield about 28 parts of the desired product.

EXAMPLE 11

*S-(4-Vinyl-2-Cyanobenzyl)-O-Sec.-Butylxanthate*

To 500 parts of methylethylketone is added 19 parts of potassium sec.-butylxanthate which is brought into solution by warming on a steam bath. 18 parts of 4-vinyl-2-cyanobenzylchloride are then added rapidly and within a few minutes potassium chloride begins to precipitate. After allowing the reaction to proceed for an additional five hours at about 25° C., the potassium chloride is removed by filtration and the solvent evaporated under reduced pressure to yield about 27 parts of the desired product.

EXAMPLE 12

*S-(4-Vinyl-2-Cyanobenzyl)-O-Ethyl-Xanthate*

To 500 parts of methylethylketone is added 22 parts of potassium ethylxanthate which is brought into solution by warming on a steam bath. 18 parts of 4-vinyl-2-cyanobenzylchloride are then added rapidly and within a few minutes potassium chloride begins to precipitate. After allowing the reaction to proceed for an additional five hours at about 25° C., the potassium chloride is removed by filtration and the solvent evaporated under reduced pressure to yield about 31 parts of the desired product.

EXAMPLE 13

*S-(4-Vinyl-3-Carbethoxybenzyl)-O-Isopropylxanthate*

To 500 parts of methylethylketone is added 17.5 parts of potassium isopropyl xanthate which is brought into solution by warming on a steam bath. 22 parts of 4-vinyl-3-carbethoxybenzylchloride are then added rapidly and within a few minutes potassium chloride begins to precipitate. After allowing the reaction to proceed for an additional five hours at about 25° C., the potassium chloride is removed by filtration and the solvent evaporated under reduced pressure to yield about 30 parts of the desired product.

EXAMPLE 14

*S-(4-Vinyl-3-Carboxybenzyl)-O-n-Octylxanthate*

To 500 parts of methylethylketone is added 25 parts of potassium n-octyl xanthate which is brought into solution by warming on a steam bath. 19.5 parts of 4-vinyl-3-carboxybenzylchloride are then added rapidly and within a few minutes potassium chloride begins to precipitate. After allowing the reaction to proceed for an additional five hours at about 25° C. the potassium chloride is removed by filtration and the solvent evaporated under reduced pressure to yield about 35 parts of the desired product.

EXAMPLE 15

*Homopolymer of S-o-Vinylbenzyl-O-n-Amyl Xanthate*

Ten grams of the xanthate of Example 1, to which has been added 0.1 gm. of azobisbutyronitrile is heated to about 65° C. for ten hours resulting in the formation of a solid homopolymer. The polymer is soluble in methylethylketone, but insoluble in alcohol.

EXAMPLE 16

*Homopolymer of S-[1(4-Vinyl)Naphthylmethyl]-O-Benzylxanthate*

Ten games of the xanthate of Example 3, to which has been added 0.1 gram of benzoylperoxide is heated at 65° for 12 hours. The resulting viscous polymeric mass is soluble in benzene and methylethylketone, but insoluble in methanol.

EXAMPLE 17

*Copolymer of S-(2-Vinyl-4-Methoxybenzyl) - O - Amyl-xanthate and Divinylbenzene*

Nine grams of the xanthate of Example 7, one gram of divinylbenzene and 0.1 g. of benzoylperoxide are mixed and heated at 65° for 12 hours. There is obtained a hard polymeric mass which is insoluble in benzene, methylethylketone, dimethylformamide, dimethylsulfoxide or methanol.

EXAMPLE 18

*Copolymer of S-(2-Vinyl-4-Methoxybenzyl) - O - Amyl-xanthate and Butadiene*

Six grams of the xanthate of Example 7, four grams of butadiene, and 0.1 gram of di-tert-butylperoxide were sealed in an ampoule and heated at 65° for 18 hours. The resulting very viscous polymeric mass was only partially soluble in benzene or in dimethylformamide, and was completely insoluble in methanol.

EXAMPLE 19

*Copolymer of S-m-Vinylbenzyl-O-Ethylxanthate and Acrylic Acid*

To a mixture of 10 grams of S-m-vinylbenzyl-O-ethylxanthate and 50 grams of acrylic acid is added 0.5 g. of azo-bisbutyronitrile. The reaction mixture is maintained at 70° C. for 19 hours whereupon the solid copolymer precipitates out. The copolymer is soluble in dilute alkali.

EXAMPLE 20

*Copolymer of S-m-Vinylbenzyl-O-Ethylxanthate and Methyl Methacrylate*

Ten grams of m-(chloromethyl)styrene, ten grams of methylmethacrylate and 0.2 gram of benzoylperoxide is heated at 65° for 12 hours. The resulting copolymer is isolated and purified by dissolving the crude reaction mass in dimethylformamide and precipitating the polymer with methanol. To 5 grams of this copolymer, dissolved in methylethylketone is added 5 grams of potassium O-ethylxanthate. Within a few minutes potassium chloride begins to precipitate. After allowing the reaction to proceed for an additional 5 hours at about 25° C., the potassium chloride is removed by filtration and the desired copolymer isolated by precipitation from methanol.

EXAMPLE 21

*Copolymer of S-m-Vinylbenzyl-O-Ethylxanthate and Acrylonitrile*

A sealed ampoule charged with 5.9 parts of S-m-vinyl-benzyl-O-ethylxanthate, 27.5 parts of acrylonitrile and 0.3 part of di-tert-butylperoxide was heated at 60° for 18 hours. Workup of the polymer by dissolving it in dimethylformamide and precipitating it from methanol gives 25 parts of white powder. This copolymer was found to contain 8.5 mole percent of the xanthated monomer by microanalysis for sulfur.

EXAMPLE 22

*Copolymer of S-(2-Vinyl-1-Biphenylylmethyl)-O-Ethyl-xanthate and Styrene*

Ten grams of styrene and 10 grams of p-(chloromethyl)styrene are copolymerized by heating at 60° for 12 hours employing a benzoylperoxide initiator. Ten grams of this copolymer is then dissolved in 200 ml. of methylethylketone and 10 grams of potassium, amyl xanthate, dissolved in 100 ml. of the same solvent, is added. Within a few minutes potassium chloride begins to precipitate. After allowing the reaction to proceed at about 25° C. for an additional 5 hours, the potassium chloride is removed by filtration, and the desired copolymer isolated by precipitation from methanol.

EXAMPLE 23

*Copolymer of S-m- and p-Vinylbenzyl-O-Ethylxanthate and Methylvinyl Ketone*

Ten grams of a mixture of isomers composed of 60% meta- and 40% para-S-vinylbenzyl-O-ethylxanthate, 5 grams of methylvinyl ketone and 0.15 gram of azo-bis-butyronitrile are sealed in an ampoule and heated at 65°

EXAMPLE 24

*Copolymer of S-m and p-Vinylbenzyl-O-Sec.-Butylxanthate With Isopropenylacetate*

Ten grams of a mixture of m- and p-(chloromethyl)-styrene and ten grams of isopropenylacetate are copolymerized at 65° C. using a benzoyl peroxide catalyst. Fifteen grams of this copolymer is then dissolved in 200 ml. of methylethylketone to which is added 100 ml. of another methylethylketone solution containing 10 grams of sodium O-sec.-butylxanthate. Within a few minutes sodium chloride beings to precipitate. After allowing this reaction to proceed for an additional 5 hours at about 25° C., the sodium chloride is removed by filtration and its desired copolymer isolated by precipitation from methanol.

EXAMPLE 25

*Copolymer of S-(4-Vinyl-3-Chlorobenzyl)-O - n - Amylxanthate and Maleic Anhydride*

Seventeen grams of 4-vinyl-3-chlorobenzylchloride are mixed with 10 grams of maleic anhydride and 0.1 g. of benzoyl peroxide is added. The mixture is heated at 90° for 12 hours. The resulting hard copolymer is dissolved in dimethylformamide and precipitated with methanol. Twenty grams of this copolymer are then redissolved in dimethylformamide and 15 grams of potassium O-n-amylxanthate are then added. Within a few minutes all of the xanthate goes into solution and potassium chloride begins to precipitate. After allowing the reaction to proceed for an adidtional five hours at about 25° C., the potassium chloride is removed by filtration and the desired copolymer isolated by precipitation with methanol.

We claim:

1. A xanthate polymer consisting essentially of the polymerization product of
   (a) an S-vinylarylmethyl-O-hydrocarbon-xanthate with
   (b) from zero to 99 parts by weight of a copolymerizable vinyl monomer.

2. A xanthate polymer consisting essentially of the polymerization product of
   (a) a xanthate of the formula

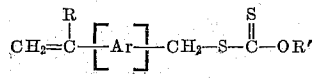

wherein R is a member selected from the group consisting of hydrogen and methyl; Ar is a carbocyclic aromatic nucleus of one to two 6-membered rings; and R' is a radical selected from the group consisting of alkyl and aralkyl; with
   (b) from zero to 99 parts by weight of a copolymerizable vinyl monomer.

3. As a composition of matter the homopolymer of S-vinylbenzyl-O-amylxanthate.

4. A compound represented by the formula

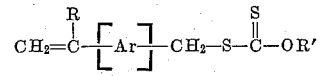

wherein R is a member selected from the group consisting of hydrogen and methyl; Ar is a carbocyclic aromatic radical of one to two 6-membered rings; and R' is a radical selected from the group consisting of alkyl and aralkyl.

5. The compound S-vinylbenzyl-O-amylxanthate.

6. A process for the preparation of a xanthate polymer which comprises condensing (1) the polymerization product of a mixture comprising
   (a) an effective amount of a polymerization catalyst,
   (b) an ar-vinyl aromaticmethyl chloride wherein the aromatic moiety is a carbocyclic radical of one to two 6-membered rings, and
   (c) from 0 to 99 parts by weight of a copolymerizable vinylmonomer,
with (2) an O-hydrocarbon substituted alkali metal xanthate; and recovering the polymeric reaction thus formed.

7. A process for the preparation of a xanthate polymer which comprises (a) condensing a vinylaromaticmethylchloride wherein the aromatic moiety is a carbocyclic radical of one to two 6-membered rings with an alkali metal xanthate of the formula:

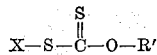

wherein X is an alkali metal; and R' is a member selected from the group consisting of alkyl and aralkyl, and (b) polymerizing the condensation product of (a) with from zero to 99 parts by weight of a copolymerizable vinylmonomer; and (c) recovering the polymer thus formed.

References Cited in the file of this patent

FOREIGN PATENTS 700,334    Great Britain _____ Nov. 25, 1953